United States Patent [19]

Hoeller

[11] Patent Number: 5,497,335
[45] Date of Patent: Mar. 5, 1996

[54] SYSTEM FOR CREATING A FAULT DIAGNOSIS ON PRODUCTION MACHINES AND APPLICATION OF THE SYSTEM ON TEXTILE MACHINES

[75] Inventor: Robert Hoeller, Uster, Switzerland

[73] Assignee: Zellweger Luwa AG, Switzerland

[21] Appl. No.: 50,061

[22] PCT Filed: Sep. 3, 1992

[86] PCT No.: PCT/CH92/00180

§ 371 Date: May 10, 1993

§ 102(e) Date: May 10, 1993

[87] PCT Pub. No.: WO93/05477

PCT Pub. Date: Mar. 18, 1993

[30] Foreign Application Priority Data

Sep. 10, 1991 [CH] Switzerland .................... 02651/91

[51] Int. Cl.$^6$ .................................................. G06F 19/00
[52] U.S. Cl. .......................... 364/470; 73/160; 364/552
[58] Field of Search ................................ 395/50–77, 904, 395/906; 364/470, 507, 552; 371/15.1; 73/160, 159

[56] References Cited

U.S. PATENT DOCUMENTS

| | | | |
|---|---|---|---|
| 3,818,236 | 6/1974 | Lind et al. | 250/561 |
| 4,024,734 | 5/1977 | Jordan | 66/158 |
| 4,384,596 | 5/1983 | Brouer et al. | 139/370.2 |
| 4,619,527 | 10/1986 | Leuenberger et al. | 356/238 |
| 4,766,647 | 8/1988 | Ackermann, Jr. et al | 73/160 |
| 4,916,625 | 4/1990 | Davidson et al. | 364/470 |
| 4,926,344 | 5/1990 | Collins et al. | 364/513 |
| 5,010,494 | 4/1991 | Lord | 364/507 |
| 5,127,005 | 6/1992 | Oda et al. | 371/15.1 |
| 5,146,550 | 9/1992 | Furter et al. | 364/470 |
| 5,155,691 | 10/1992 | Sainen | 364/470 |

Primary Examiner—Roy N. Envall, Jr.
Assistant Examiner—Steven R. Garland
Attorney, Agent, or Firm—Burns, Doane, Swecker & Mathis

[57] ABSTRACT

The creation of fault diagnosis takes place using a knowledge-based evaluation of signals which signal the quality of the products produced, for example using spectrograms obtained in the investigation of parameters of textile fiber or filament structures. A first evaluation unit (NA) is provided for the detection of characteristic deviations of the spectrograms, which unit generates a so-called fault descriptor (SD) for each such deviation. A second evaluation unit (WA) uses a knowledge base (WB) to determine possible fault causes for each fault descriptor.

15 Claims, 7 Drawing Sheets

```
271 mm   3 channels   Change in CV 0.27%   30% of the
                                            samples
sample 3; sample 7; sample 9;
Gear unit run-out lower cylinder run-out part flyer: 1
(Flyer vibrations according to Rule 6)
- - - - - - - - - - - - - - - - - - - - - - - - - - - - - - - - - - -
1.89 m   1 channel   Change in CV 0.21%   20% of the   samples
Sample 5; sample 10;
Preliminary draft change gear unit middle-lower
cylinder
Middle part ring spinning machine: gt
Middle-lower cylinder middle part ring spinning machine: d
```

FIG. 7

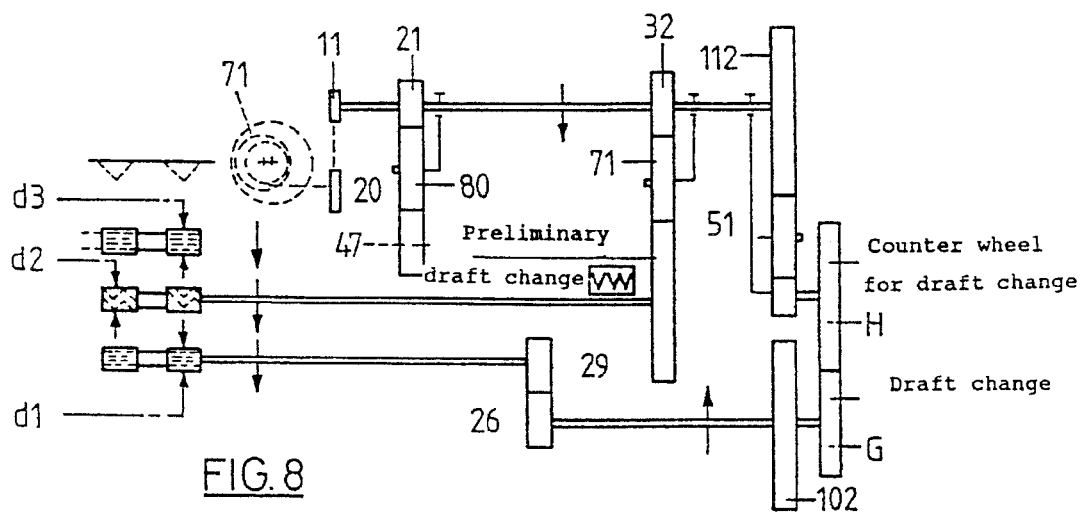

FIG. 8

SYSTEM FOR CREATING A FAULT DIAGNOSIS ON PRODUCTION MACHINES AND APPLICATION OF THE SYSTEM ON TEXTILE MACHINES

BACKGROUND OF THE INVENTION

The present invention relates to a system for creating a fault diagnosis on production machines using a knowledge-based evaluation of signals representing the quality of the products produced, having a knowledge base containing the expert knowledge required for the evaluation, having software units intended for access to the said base, and having a user interface.

Systems of this type, which are referred to as expert systems, have been known for some time, in particular for the fault and defect diagnosis of electronic components; see in this respect, for example, the article "An Expert System for Help to Fault Diagnoses on VLSI Memories" by T. Viacroze et al in the Journal for the International Symposium for Testing and Failure Analysis (ISTFA), October/November 1988, Los Angeles, pp. 153–158. The system described in this article first of all analyses the data of the tester and then derives from the knowledge of the knowledge base the appropriate rules for the causes of the defects. Then, at a second stage, a further analysis takes place in dialog with the operator and, finally, a defect diagnosis takes place, which provides forward and backward adjustment.

Systems which are to be used efficiently for diagnosis in the case of complexly constructed machines must be capable of describing at least several hundred individual parts and their arrangement in subassemblies or subsystems, as well as of applying typically up to 100 or 200 rules. In addition, a good integration into a conventional and extensive program environment, which carries out the storage and preprocessing of the signals mentioned, must be ensured. In practice, moreover, a response time in the range of seconds, where possible even less, is expected. At present, such requirements can be met only by large systems, the use of which is out of the question for the typical user, for reasons of cost.

The invention has the object of designing a system of the type mentioned at the beginning in such a way that a rapid and reliable fault diagnosis is possible with an inexpensive computer. This requirement is significantly more important in the case of production machines than in the case of test systems for electronic circuits, since in the case of these machines every defect generally results in defective or deficient products and therefore has to be rectified in the shortest possible time.

SUMMARY OF THE INVENTION

The object set is achieved according to the invention by the knowledge base having a description of the machine parts belonging to the production machine concerned, by means of a component hierarchy which is divided in the form of a tree structure and in which each object is described by a node in the tree structure and can be addressed by a path name assigned to the respective node, and in which each dependent node is dependent on precisely one superordinate node.

By this special structuring of the knowledge base, success has been achieved in meeting the requirements mentioned with an inexpensive computer, for example a personal computer.

The invention further relates to an application of the said system on textile machines for the production of fibre or filament structures.

Applications of expert systems for textile machines are still virtually unknown today. This is so since the systems referred to in the literature as expert systems are typically not knowledge-based, but achieve process control or process optimisation by conventional methods. For example, a method is described in U.S. Pat. No. 4,916,625 for optimising the operation of a spinning machine using a knowledge base, in which however, it is in fact indicated only to the operating personnel when a full bobbin has to be removed from the machine. Although the knowledge base draws certain conclusions from the signals of sensors as to the time of the occurrence of certain events, it cannot create any fault diagnoses or make any statements as to the cause in the event of faults. As a distinction from this, the application according to the invention of the system on textile machines is intended to make an exact fault diagnosis possible.

This object is achieved according to the invention by signals representing the quality of the products produced being formed by spectograms obtained in the investigation of parameters of the fibre or filament structures, by a first evaluation unit being provided for the detection of characteristic deviations of the spectograms, which unit generates a so-called fault descriptor for each such deviation, and by a second evaluation unit being provided, which determines possible fault causes for each fault descriptor using the knowledge base.

BRIEF DESCRIPTION OF THE DRAWINGS

The invention is explained in more detail below with reference to an exemplary embodiment and the drawings, in which:

FIGS. 6–8 show a representation of a practical example.

DESCRIPTION OF THE PREFERRED EMBODIMENT

Figure 1:
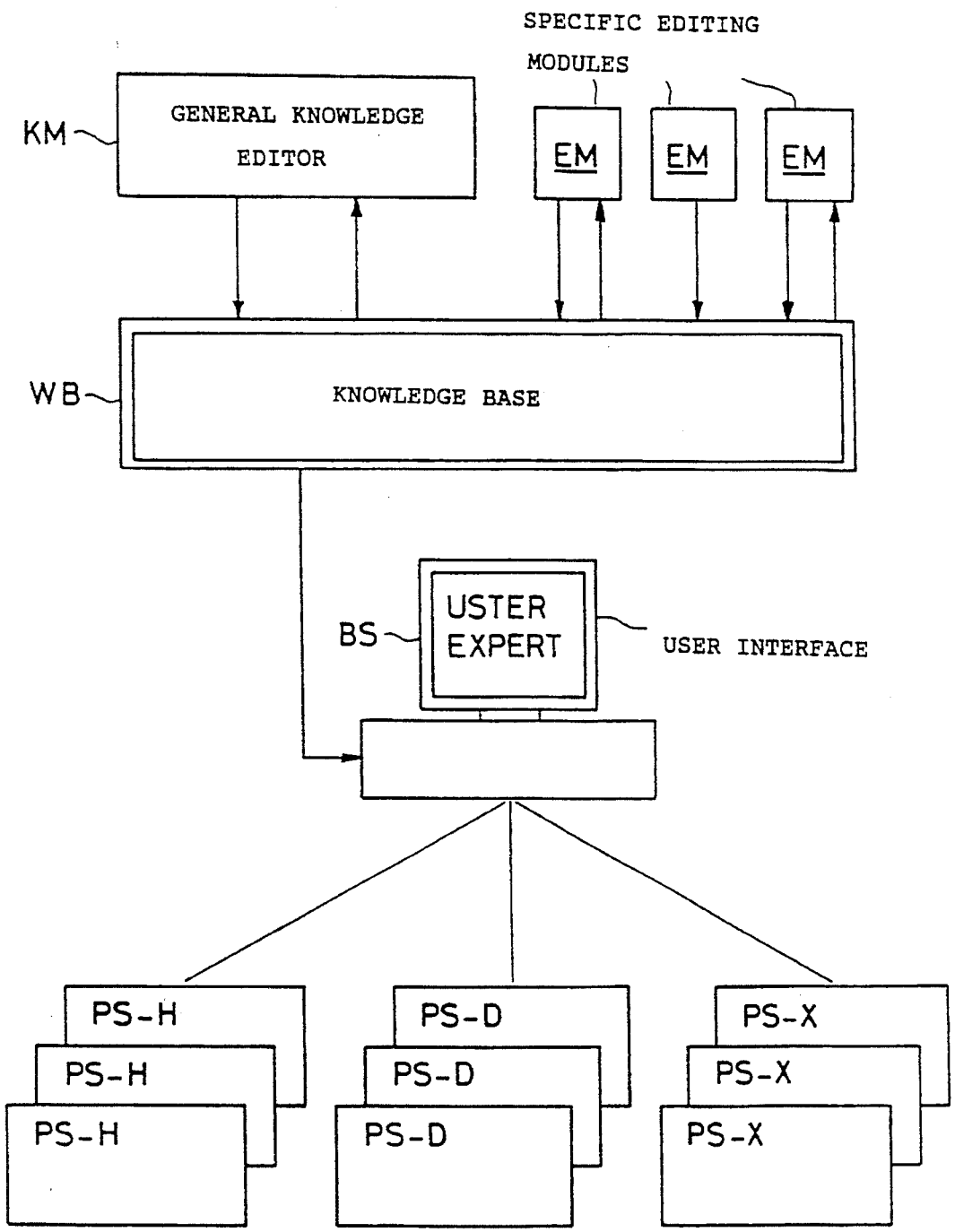
FIG. 1 shows a diagrammatic representation of the overall concept of an expert system according to the invention.

FIG. 1 shows a possible representation of the overall concept of an expert system according to the invention, in which the knowledge base WB takes central importance. The knowledge base WB contains the necessary expert knowledge, that is for example textiles knowledge, in the form of rules and structural descriptions of the corresponding production machines (textile machines) together with the parameters necessary for the evaluation, such as for example drafts, diameters of rollers and cylinders, and the like. Also included in the knowledge base WB are references to graphics and texts, which can appear on a screen in a consultation.

A series of software units which are intended for various functions can access the knowledge base WB. For all applications, the same general knowledge editor KM is available, with which the knowledge base WB can be set up and maintained, the access to the knowledge base being unrestricted for this editor in any event. For specific applications, more simple editing modules EM may be made available, in which however the access to the knowledge base WB is subjected to greater restrictions to preserve consistency.

The information items included in the knowledge base WB are utilized by a "Production System" PS, which offers the user a consultation and includes in particular a user interface BS, having a screen. According to the representation, three classes of production systems are provided, namely control-application systems PS-H for simple control processing, diagnosis systems PS-D and systems PS-X for specific applications. These three classes differ in particular in the type of processing of the content of the knowledge base, such as for example in the search strategy or in the control processing.

Figure 2:
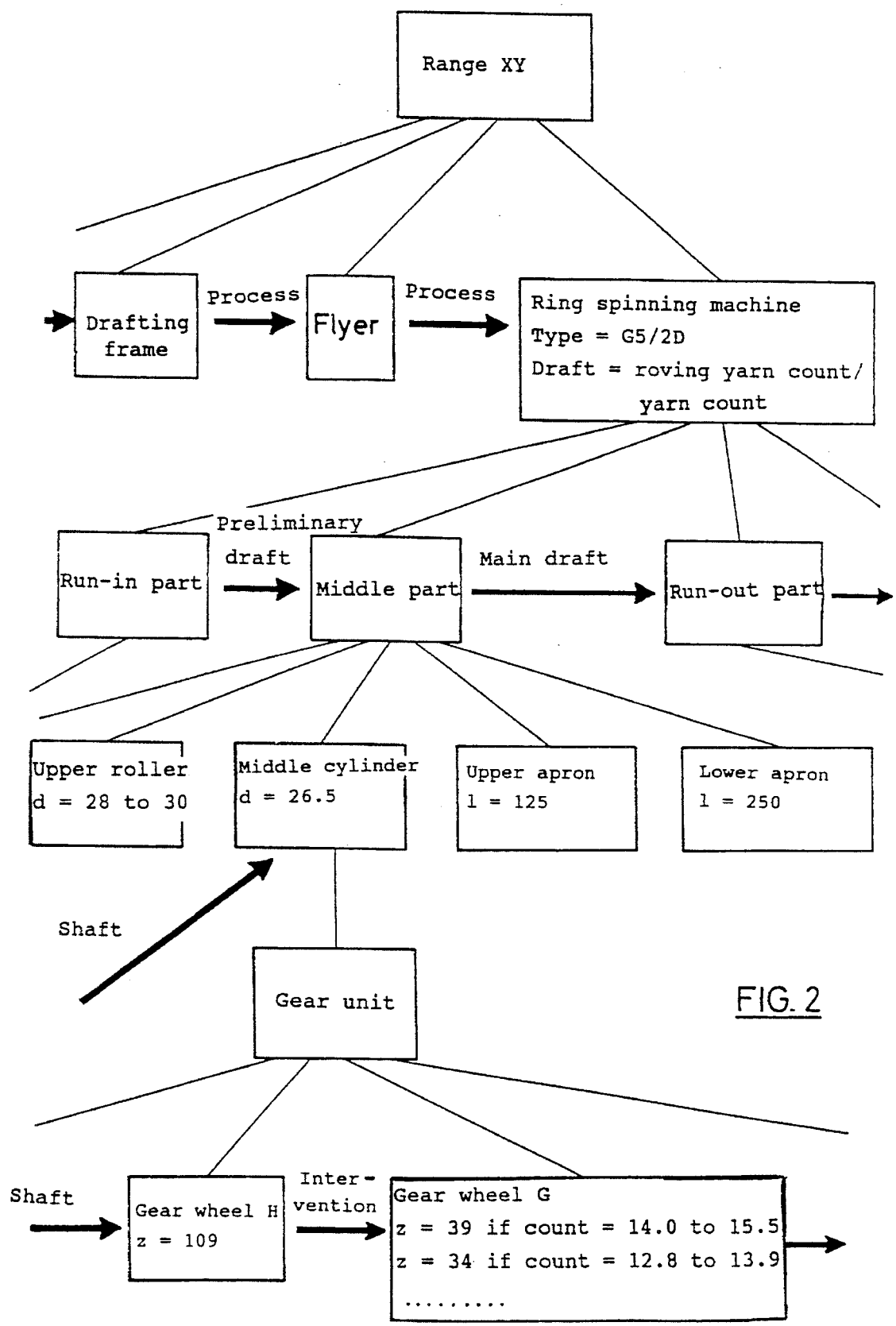
FIG. 2 shows a diagrammatic representation of the description of the machine structure in the knowledge base of the expert system of FIG. 1.

FIG. 2 shows the structuring of the knowledge base WB, which creates a list with diagnosis proposals for each deviation, indicating a fault, of the monitored signal. Since, in practice, a great number of possible fault causes have to do with defective machine parts, the system requires as accurate a description as possible of the construction of the respective textile machine. In particular, it must be known of which part-systems, such as card, drafting frame etc, the production line is made up. These part-systems can for their part be subdivided into subsystems, etc., until finally one arrives at defect-causing components (for example cylinders, aprons).

In the case of the expert system according to the invention, each object is described by a node in a tree structure, each node, with the exception of the root node, being dependent on precisely one superordinate node. This dependence is usually to be interpreted as a "part of" or as an "is a" relation. The addressing of individual nodes takes place with a path name, which begins with the name of the node and, for precise identification, may also comprise the names of hierarchically higher nodes. These path names prove to be very useful in particular if there is a plurality of nodes of the same name in the system, because then reference can be made both to all objects of the same name and also only to a specific object.

For example, the address "drafting system" denotes each and every drafting system, the address "drafting system flyer" denotes each drafting system on a flyer, and the address "drafting system —"RS"— "M3" denotes the drafting system of the specific ring spinning machine M3. This name convention implicitly also comprises the principle of inheritance. This means that, although on the one hand each node can be uniquely identified by its position in the tree structure, on the other hand it also inherits all the references or values which relate to a general object which is not uniquely addressable due to a shortened path name and is therefore fictitious (for example "drafting system").

As can be seen from the nodes "upper roller", "middle cylinder", "upper apron" and "lower apron" in FIG. 2, subordinate to the node "middle part", each node can be assigned data or values (for example dimensions such as diameter or length, circumferential speeds, states and the like). In the case of nodes having the same value which occur more than once, use is made of the shortened path name, in order to have to enter the data only once.

With the nodes themselves, only individual objects can ever be described. In addition, however, relations between, in each case, two nodes can also be provided with a name, which is symbolised in FIG. 2 by the thickly drawn-in arrows. With the relations, to which likewise any number of values can be assigned, it is possible to denote, for example, the power transmission in a gear unit or the draft of a fibre structure between two clamping points. An example of what can be stored as knowledge is that the fibre material runs from the rear cylinders to the front cylinders and that in this case a draft of 1.3 occurs.

Finally, also used as further units of knowledge are rules, which comprise a number (or a name) uniquely identifying the rule, a series of conditions and a single consequence. One rule, and consequently also its consequence, is considered satisfied if all the conditions are met. The consequence and each individual condition form the basic elements of a rule. These basic elements may be any texts ("the yarn twist is too low"), negated expressions or expressions with a location specification. Both in the case of conditions and in the consequence part, reference can be made to nodes or relations between nodes. This possibility of being able to make reference in the rule directly to nodes is very useful specifically for the search strategy in the case of diagnostic problems or in the case of operating instructions.

The expert system may be realised with the assistance of any programming language. By virtue of its outstanding suitability for the evaluation of the knowledge base WB, however, the programming language Prolog is preferably used (W. F. Clocksin & C. S. Mellish "Programming in Prolog", Springer Verlag 1981).

Figure 3:
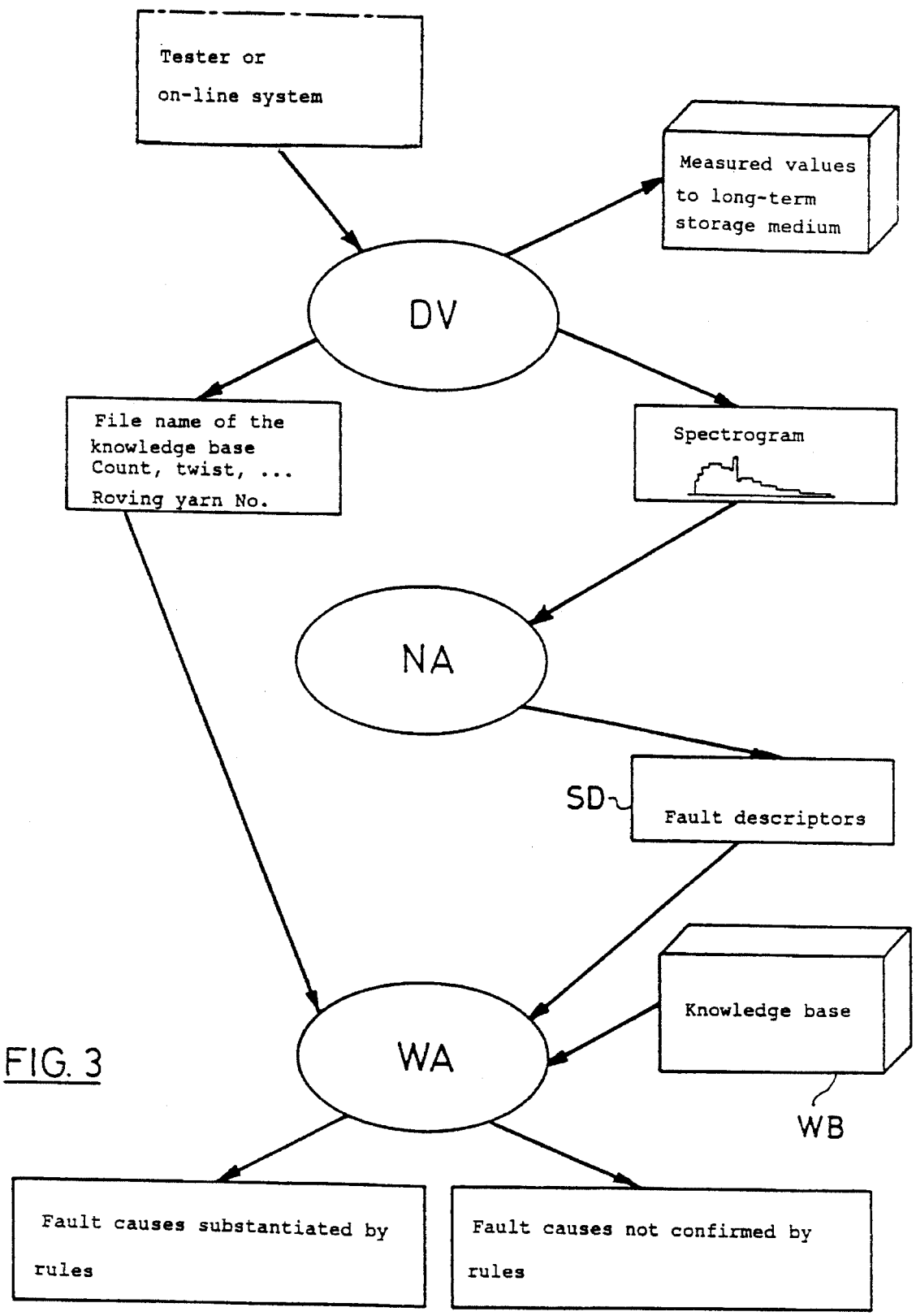
FIG. 3 shows a diagrammatic representation of the sequence of the diagnoses.

FIG. 3 shows in a different type of representation than FIG. 1 the construction of an expert system for creating a fault diagnosis on textile machines and gives an overview of the sequence of diagnosis, this system receiving from a tester or from an on-line data system quality data, in particular evenness data, of a textile intermediate or final product, detecting significant deviations from predetermined set values or set curves and determining the technical causes of these deviations.

According to the representation, the expert system comprises the three modules data storage/data administration DV, numerical evaluation unit NA and knowledge-based evaluation unit WA.

The data storage/data administration module DV serves for permanent storage of the received test data, it being possible for the stored data to be made available at any time for an evaluation. For the storage and administration of the test data, any conventional database system may be used, assuming it has the following in terms of functionality:

Acceptance of the data from the tester or on-line system.

Storage of the test data on a long-term storage medium (for example hard disk),

Provision of a user interface, which enables the user to retrieve the stored data.

Copying of the data selected by the user into the system memory (RAM) of the computer, from where said data can be read by the downstream evaluation units.

Provision of the measured values; according to the representation, these are the points of a spectrogram, for example an evenness spectrogram, a hairiness spectrogram or a twist spectrogram (on the spectrogram subject, see for example the publication by R. Furter "Evenness Testing in Yarn Production: Part I", The Textile Institute 1982 and the article "Neue Wege zur Messung der Haarigkeit yon Garnen" (New Ways of Measuring the Hairiness of Yarns) by R. Furter, P. Hättenschwiler and H. Wampfler in MELLIAND TEXTILBERICHTE 69 (1988), 617–619).

Provision of additional information items on the sample, such as for example yarn count, yarn twist, roving yarn number, file name of the knowledge base and the like.

The numerical evaluation unit compares the spectrogram continuously with a predetermined limit value, in order to detect so-called "stacks", which are caused by periodic fluctuations, protrude beyond the normal curve and occur at the period length (wavelength). Due to this stack, the so-called coefficient of variation (CV %) also increases, that is the square unevenness, which may mean a disturbing loss in quality of the spun yarn concerned. This CV increase is given by the formula:

$$\Delta CV^2 = K \cdot \left( \sum_{i=a}^{b} S_i^2 - \sum_{i=a}^{b} S_{i,R}^2 \right)$$

In this formula, $S_i$ denotes the amplitude of the measured spectrogram at channel i, $S_{i,R}$ denotes the amplitude of the reference spectrogram at channel i, a, b denotes the channel numbers for the beginning and end of the stack and K is a sensor-specific proportionality factor.

For detection of a disturbing stack, the numerical evaluation unit NA compares the value of the increase in coefficient of variation with a predetermined limit value. If the latter is exceeded, a fault descriptor SD is generated, which contains the following information items on the stack:
Spectrogram identification
Wavelength range in millimeters
CV increase in %
Number of channels over which the stack extends.

If the Prolog programming language is being used, this fault descriptor is stored by means of "assert" in the database (that is the main memory of the Prolog system) as the so-called "Prolog fact" (that is a Prolog structure existing in the database).

The knowledge-based evaluation unit WA creates for this fault descriptor a list with diagnosis proposals. Since, as already mentioned in the case of FIG. 2, in practice a great number of possible fault causes have to do with defective machine parts, the system includes as accurate a description as possible of the construction of the textile machines. These information items form together with the "IF-THEN" rules, which verify or disprove a diagnosis suspicion, the knowledge base WB described with reference to FIG. 2. in practice, the said knowledge base takes the form of an ASCII file, in which the units of knowledge described with reference to FIG. 2 (nodes, values, relations between nodes, rules) are contained as Prolog facts. The knowledge base WB is read into the database by a suitable instruction.

For preparation of the knowledge base WB, the file name of the knowledge base WB is taken from a memory area made available by the data storage/data administration DV and is read into the database. Then, the part-drafts on the machine which were not yet known at the time of creation of the knowledge base WB are calculated. An example which may be given here is that of the drafts on the ring spinning machine, which vary greatly in practice, and in this case the preliminary draft being fixed in the knowledge base WB and the overall draft being obtained from the count of the roving yarn divided by the yarn count.

Subsequently, for each machine component which can induce a periodic fluctuation in mass or hairiness or possibly twist in the fibre structure, the corresponding wavelength of this fluctuation is calculated, to be precise as a product of the wavelength at the location of the component and all drafts between the location of the component and the removal point of the sample. The wavelengths thus calculated are then entered by the knowledge-based evaluation unit WA as Prolog fact in the database.

If there is then at the same time in the database a Prolog fact "calculated wavelength" and a Prolog fact "fault descriptor", the value of the calculated wavelength lying in the wavelength range of the fault descriptor, a Prolog fact "theoretical cause" is entered into the database, whereby the theoretical cause of a fault is hence determined.

The next step is the determination of the plausible causes, a (theoretical) fault cause being referred to as plausible whenever it is substantiated by a rule. For this purpose, for each "theoretical cause" Prolog fact, the knowledge-based evaluation unit WA searches in the database for a Prolog fact representing a rule having an expression affirming or negating a fault cause at the machine part concerned. In both cases, first of all the list of conditions included in the respective rule is processed. The locating of an affirming rule substantiates a machine component as responsible for the cause, the locating of a rule with a negating expression excludes the respective component as responsible for the cause, so that, after verification of the rule, the corresponding "theoretical cause" Prolog fact is erased.

Figure 4:
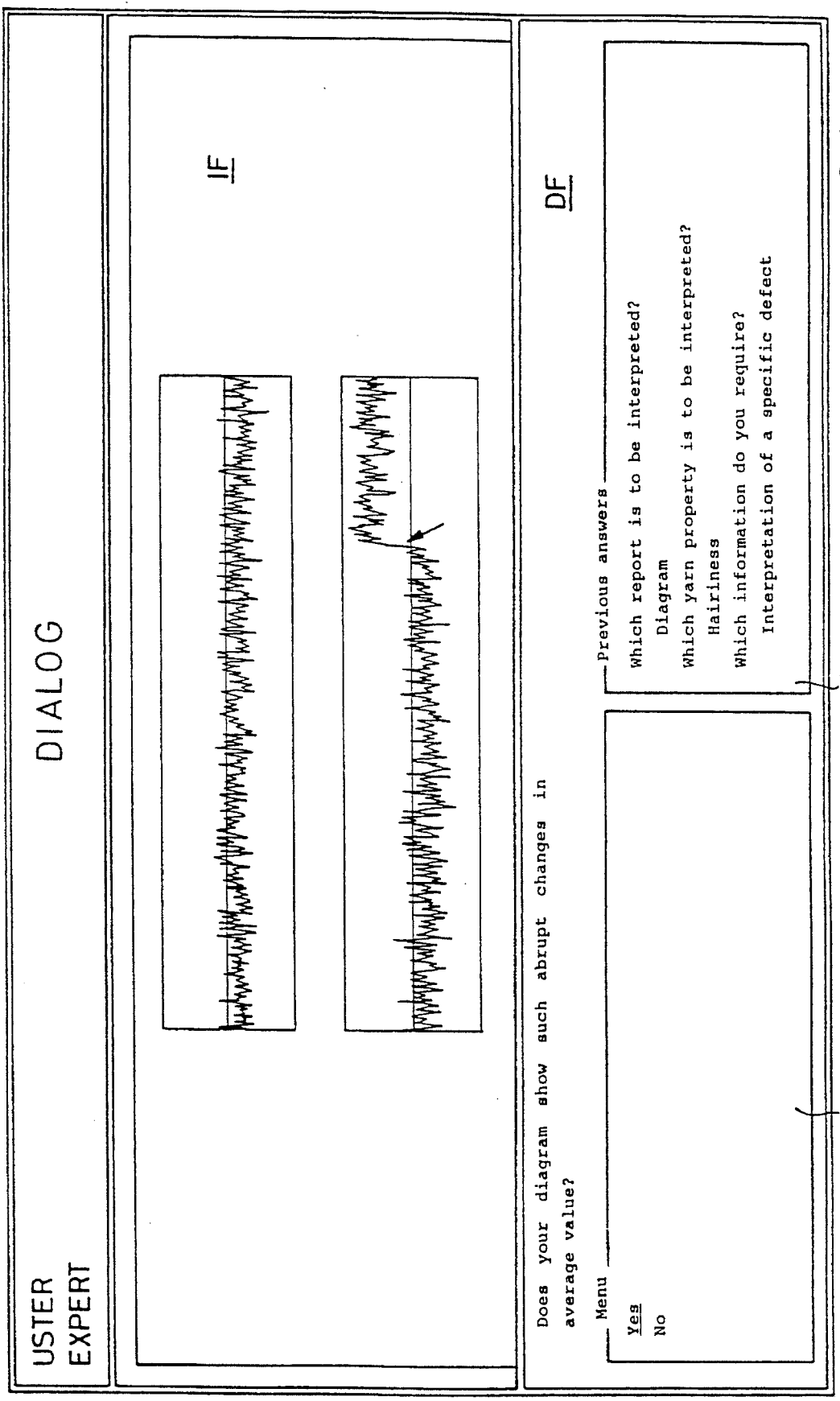
FIGS. 4, 5 show an example of the dialog with the system via a user interface.

It was mentioned in .the description of FIG. 1 that the expert system has a production system PS, which offers the user a consultation and includes in particular a user interface BS having a screen. The user interface BS, which is standard for all production systems, primarily takes the form of a "dialog" screen, which according to FIG. 4 has four areas or windows:

In the so-called "Info" window IF, items of explanatory information are displayed, which should assist the user in answering questions posed by the system. These information items may be short explanatory texts or graphics or both. In FIG. 4, the "Info" window contains a graphic with a hairiness diagram.

In the "Dialog" window DF, there appear on the one hand the questions to the operator and on the other hand his answers to the system.

The "Menu" window MF serves to facilitate input, by the user being able to perform this input via a menu. Only if the system does not present a menu for answering a question must the answer be input in the "Dialog" window.

In the "Answer" window AF, the course of the dialog is displayed. If it is wished to correct an answer given earlier, said answer can be selected in the "Answer" window AF and the dialog is recommenced from this point, all previous answers being preset as standard answers in the windows DF or MF and can be re-input by pressing a button.

The screen content represented in FIG. 4 shows a step of a dialog in a control application system PS-H (FIG. 1) which provides assistance in the interpretation of the reports supplied by a yarn testing system USTER TESTER 3 (USTER—registered trademark of Zellweger Uster AG).

Starting point: An unskilled laboratory assistant receives a hairiness diagram in which abrupt changes in average value are plotted, and uses the expert system as an interpretation aid, proceeding with the dialog specified below. In each step of the dialog, the content of the windows of the dialog screen is specified; the term of the menu underlined in each case in the indication of the menu window denotes the input by the laboratory assistant.

Figure 5:
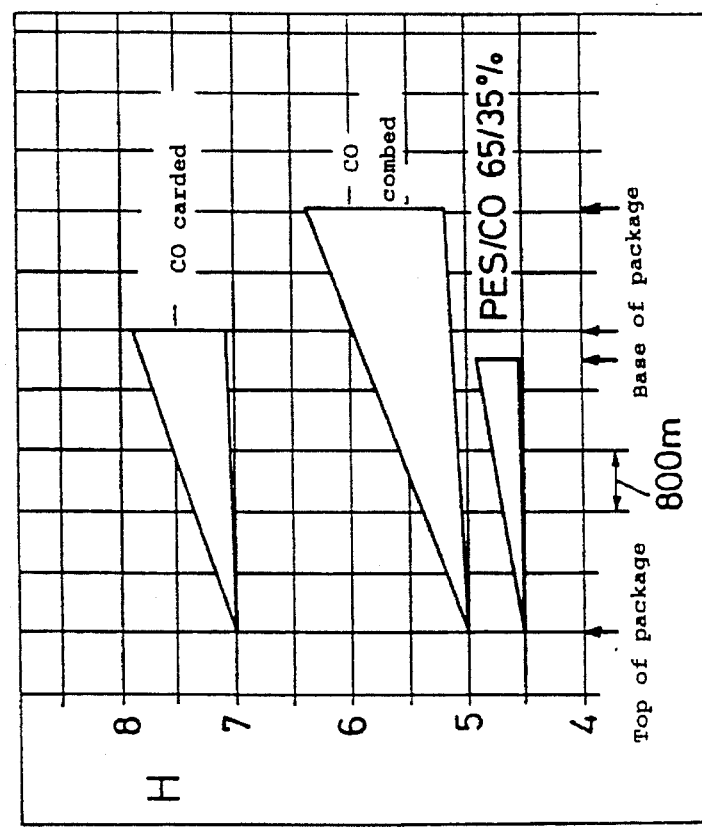

First step
IF: USTER EXPERT provides you with assistance in interpretation of reports from USTER TESTER 3.
DF: Which report is to be interpreted?
MF: Diagram, variation in length, spectrogram, listing
Second step
IF: With the USTER TESTER you can test fluctuations in mass, hairiness or twist.
DF: Which yarn properties are to be interpreted?
MF: Hairiness, mass, twist AF: Which report is to be interpreted?
Diagram
Third step
IF: Here there are two possibilities
EXPERT helps you in creating the diagnosis for a specific yarn defect.
Explanation of the principles of hairiness and fluctuations in hairiness
DF: Which information do you require?
MF: Interpretation of a specific defect
General tips on the measuring principle
AF: Which report is to be interpreted?
Diagram
Which yarn property is to be interpreted?
Hairiness
Fourth step, see FIG. 4
(This step can also take place automatically by the system automatically detecting the abrupt change in average value, so that no question has to be posed to the user.)
Fifth step
IF: None
DF: Test piece
MF: Package, cross-wound bobbin, roving yarn, twisted yarn
AF: Which report is to be interpreted?
Diagram
Which yarn property is to be interpreted?
Hairiness
Which information do you require?
Interpretation of a specific defect
Does your diagram show such abrupt changes in average value?
Yes
Sixth step
IF: No indication
DF: Spinning system?
MF: Ring combed, ring carded, rotor combed, rotor carded, combed yarn
AF: Which yarn property is to be interpreted?
Hairiness
Which information do you require?
Interpretation of a specific defect
Does your diagram show abrupt such changes in average value?
Yes
Test piece?
Cross-wound bobbin
Seventh step
IF: Indication of a curve with abrupt changes in average value and of a line which indicates the package lengths
DF: At what intervals do the abrupt changes in average value take place?
MF: As in the graphic for the package lengths at shorter intervals
AF: Which information do you require?
Interpretation of a specific defect
Does your diagram show such abrupt changes in average value?
Yes
Test piece?
Cross-wound bobbin
Spinning system
Ring carded
Eighth and final step, see FIG. 5.

For better representation of the statement or diagnoses, extensive text files and/or graphics are available, which are not tied to the format of the "Info" window. The actual sequence of a dialog together with the associated displays is fixed on the one hand by the rules entered beforehand with the knowledge editor KM (FIG. 1), and on the other hand by the data and answers to the questions of the system.

As can be seen without difficulty from the dialog reproduced, the production system PS-H primarily specialises in the application of rules and therefore can, for example, fulfill a type of manual function, the content of the manual having to be structured for the construction of the knowledge base WB hierarchically in the form of a decision tree. For example, the manual can be divided into chapters, sub-chapters, etc and it can be decided by selective questions into which sub-path the operator is guided. The rules and the answers of the operator thus fix the course of a consultation. The rules also state in addition which information items the user receives.

The production system PS-D is a diagnosis system in which the search strategy is fixed primarily by the hierarchical structure of the object to be investigated, then possibly by functional relationships between subsystems and only finally by rules.

If, for example, a ring spinning machine is structured into run-in part, middle part, run-out part etc., the diagnosis system first of all attempts to localise a fault to one of these subassemblies, it also being possible to take into consideration functional relationships between these subassemblies (for example the influence of a defective component in the run-out part on the middle part). Subsequently, the system then searches one stage lower, by looking at the subdivision into lower cylinder, upper roller, etc. (see in this respect FIG. 2).

In the case of the production system PS-X, the knowledge-based part essentially comprises a PS-H or a PS-D system and is integrated in a conventional environment. Before the application of rules and/or the creation of diagnoses, a problem-specific module can be used to combine information items from the knowledge base with current data and consequently generate new facts relevant for the rules. Diagnosis and instructions (for example repair instructions) are supported as extensively as possible by graphics. For example, gear unit plans are displayed and there is the possibility of marking an individual object (for example a gear wheel) by an arrow and/or emphasising it in colour, possibly including its designation.

For the experienced user, there is the possibility of explicitly confirming, modifying or rejecting results of a diagnosis. If, for example, a periodic fault has been found and is displayed together with the diagnosis of the presumed cause of the defect, the user can then
 substantiate a proposed diagnosis,
 reject a proposed diagnosis,
 specify a new cause (not proposed by the system) for the period, or
 mark the period as uncritical.
The information items input in this way by the user influence the expert knowledge stored in the knowledge base and are included in considerations in future evaluations. As a result, the system becomes a learnable expert system.

The dialog may also proceed by the system asking the user when it specifies a diagnosis proposal whether he can accept the proposal and stipulate to him the following menu for the answer:
 I don't know
 Yes, certainly
 Yes, but only if . . .
 No
 No, if . . .

A further possibility for learnability is obtained by the system registering the frequency of the answers from a certain menu and, using the frequencies to perform a weighting and/or stringing of the possible answers, making the menus clearer and easier to use.

Figure 6:
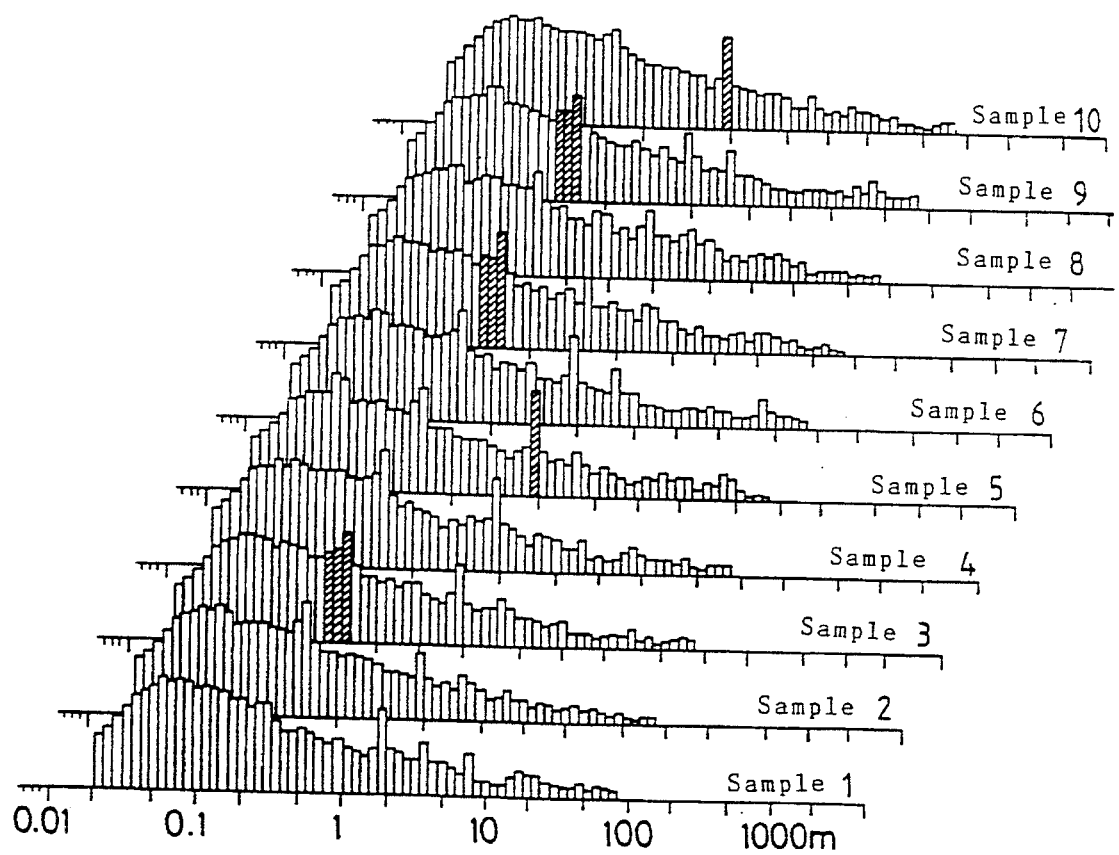

A practical example of the diagnosis of evenness spectrograms obtained by an USTER TESTER 3 is represented in FIGS. 6 to 8: FIG. 6 shows the spectrograms of 10 different samples represented on one image (see in this respect EP-A-249 741). It can be seen that samples 3, 7 and 9 have a periodic defect (first defect) at a wavelength of 271 mm and samples 5 and 10 have such a defect (second defect) at 1.89 m.

FIG. 7 shows the spectrogram diagnosis with the two defects, the number of respective defective channels (in the case of the first defect there are three channels and in the case of the second defect there is one channel), with the CV % increase, the proportion of defective samples in % and with the number of the defective samples. For the first defect, "flyer vibrations" is determined as the cause of the defect on the basis of an USTER EXPERT rule (No. 6) and two possible causes are specified for the second defect:

Preliminary draft change gear unit middle-lower cylinder Middle part ring spinning machine: gt Middle-lower cylinder middle part ring spinning machine: d (The letter d in the case of the second cause stands for "diameter" and gt in the case of the first cause stands for "gear unit").

To be able to decide which of the two causes applies, the system subsequently poses the question whether the defect occurs in the case of more than one sample. If the answer is yes (yes there are two defective samples), the system decides on the second cause. This is because a defect in the preliminary draft change must affect more than one sample, on the other hand a defect in the middle-lower cylinder does not have to.

To illustrate this better, USTER EXPERT then additionally shows as an aid the machine plan, of which sections are shown in FIG. 8 and in which the defective point is denoted clearly visibly: in a small box marked in colour there appears (vw) for a preliminary draft change in the gear unit of the ring spinning machine.

Since the example represented in FIGS. 6 to 8 is a case from practice, it was possible to verify the diagnosis of the system. Checking back with the person in charge of ring spinning revealed that the preliminary draft change had been moved out to the machine in question for servicing purposes and subsequently not reset again in the regulation way.

As has been shown, the system determines the stacks in the spectrogram automatically, thus does not require any indications from the operator that a defect exists. However, when the system has built up adequate expert knowledge, the degree of automation can be further increased by allowing the dialog to proceed automatically, which does not present any difficulties in as much as the system does have most of the items of information itself. For instance, the system knows itself in the case just described that the defect occurs in the case of more than one sample. This automation has proved to be particularly advantageous in operational practice.

I claim:

1. A system for diagnosing a fault on at least one textile machine for the production of fiber or filament structures, comprising:

means for investigating parameters of the fiber or filament structures and generating spectrograms representing the unevenness of the products produced by said machine, a first evaluation unit for the detection of characteristic deviations of the spectrograms, which unit generates a fault descriptor for each such deviation, a knowledge base containing a description of machine parts belonging to said textile machine, in the form of a component hierarchy which is represented by a tree structure and in which each machine part is described by a node in the tree structure, software units for access to said knowledge base, a user interface for enabling users to interact with said system, and, a second evaluation unit which uses the knowledge base to determine possible fault causes for a fault descriptor.

2. The system according to claim 1, wherein said nodes include assigned values or attributes.

3. The system according to claim 2, wherein the knowledge base includes a collection of rules, in which reference can be made to the components via the path names, and which in each case contains a multiplicity of conditions and a single consequence.

4. The system according to claim 3, wherein the knowledge base contains relations which represent directed connections, each having an attribute, between individual nodes, which describe mechanical or functional connections between the parts described by the respective nodes.

5. The system according to claim 1 wherein said knowledge base includes a wavelength of fluctuation for each machine component which can induce a periodic fluctuation of the parameters investigated.

6. The system according to claim 1, wherein said first evaluation unit includes means for calculating an increase in a coefficient of variation of a parameter, means for comparing said increase with a predetermined limit value, and means for generating a fault descriptor if this limit value is exceeded.

7. The system according to claim 6; wherein the fault descriptor contains information pertaining to a wavelength range of an overshoot, the increase in the coefficient of variation and a number of channels over which said increase extends.

8. The system according to claim 7, wherein the knowledge base contains a wavelength of a fluctuation determined by multiplication of the wavelength at the location of the respective machine component by the totality of drafts between the location of the machine component and the removal point of the sample, and wherein said second evaluation unit includes means, responsive to the generation of a fault descriptor of which the wavelength range covers a particular wavelength included in the knowledge base, for producing a hypothesis that the machine component assigned to this particular wavelength is responsible for the cause of the fault described by the fault descriptor.

9. The system according to claim 8, further including means for classifying plausible hypothetical fault causes which are substantiated by a rule and displaying said plausible fault causes on the user interface.

10. The system according to claim 9, wherein the user interface has a dialog screen on which the plausible fault causes are displayed, to provide the user with the possibility of substantiating or rejecting displayed fault causes.

11. The system according to claim 10, wherein the dialog screen has a first window for displaying explanatory information items, a second window for questions to the operator and for replies to the system, a third window for displaying a menu to make input easier and a fourth window for displaying the course of a dialog.

12. The system according to claim 11, wherein fault causes rejected by the user are erased in the knowledge base and fault causes substantiated by the user are weighted more strongly by the second evaluation unit.

13. The system of claim 1 in which said second evaluation unit addresses each node of said knowledge base by a path name beginning at the respective node, and wherein each dependent node of said knowledge base is dependent on precisely one superordinate node.

14. A system according to claim 1, wherein the knowledge base contains:

sets of relationships between individual nodes where the relationships represent drafts, material flow or gear interactions.

15. A system according to claim 1, wherein the knowledge base contains:

a set of expert rules which refer to the fault descriptor.

* * * * *